United States Patent Office 3,161,782
Patented Dec. 15, 1964

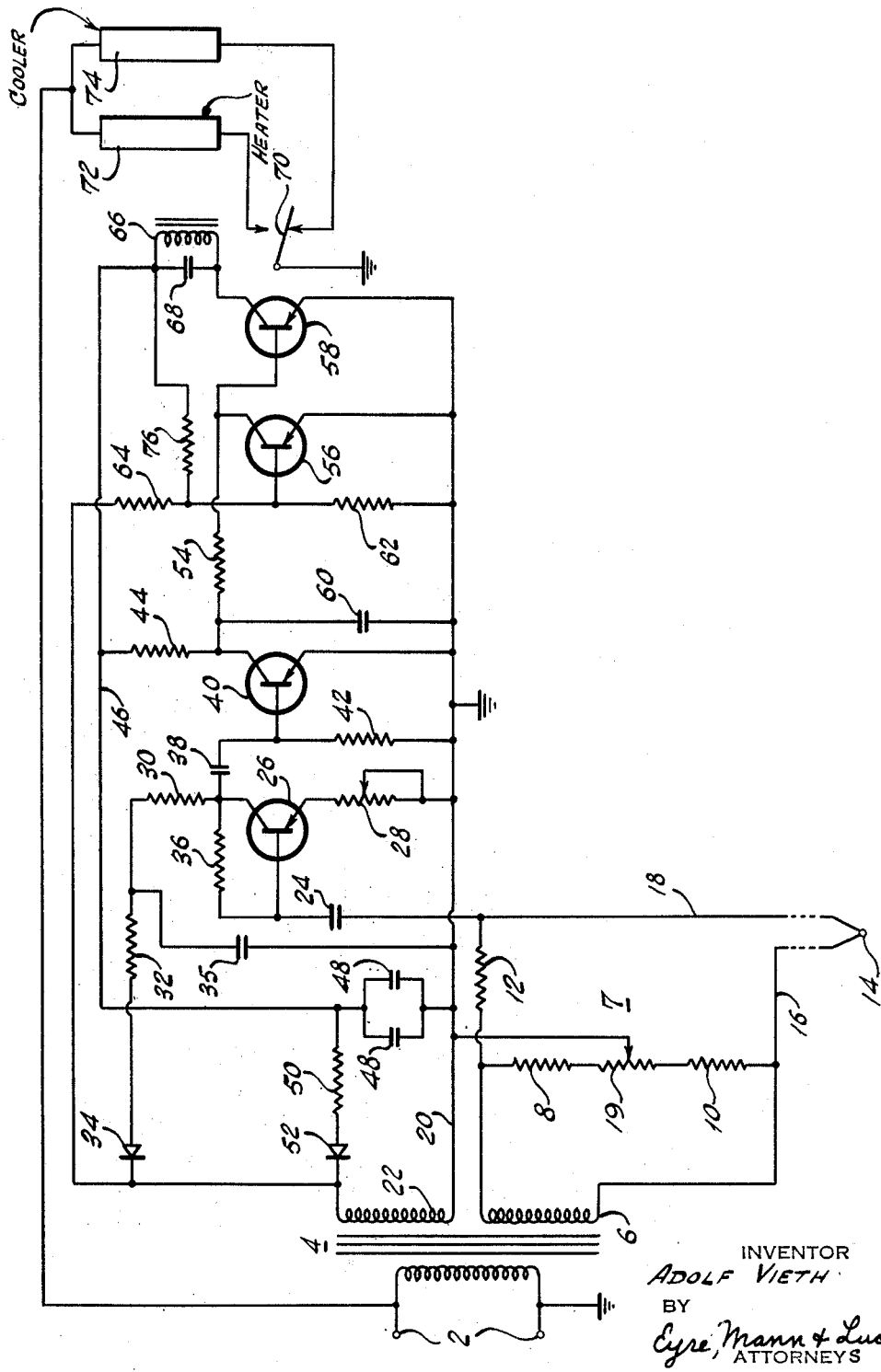

3,161,782
CONTROL CIRCUIT
Adolf Vieth, Wanaque, N.J., assignor to Tung-Sol
Electric Inc., a corporation of Delaware
Filed May 19, 1961, Ser. No. 111,248
3 Claims. (Cl. 307—88.5)

The present invention relates to circuits for control of a condition such as temperature and comprises a novel, simple, and sensitive circuit for control of a direct current relay in response to unbalance of an alternating current bridge circuit, indicative of a change in the condition to be controlled. The control circuit includes phase responsive means for distinguishing the direction of unbalance of the bridge and thereby causing energization of the relay when the condition varies in one direction and deenergization of the relay when the condition varies in the other direction. The relay over front and back armature contacts can thus close appropriate circuits for restoring the condition to the desired state. For example, when the new circuit is employed for temperature control the relay armature in one position closes the circuit of a heating device and in the other position opens such circuit. In the other position the armature may close a circuit that controls a cooling device.

As the invention is particularly suited for use in temperature control the new circuit will be described in connection with such application. In the preferred embodiment of the invention the circuit is connected across diagonals of an alternating current Wheatstone bridge network in one arm of which is a temperature sensitive element such as a thermistor. The circuit is energized by transformer action from the same 110 v. A.C. power lines that provide the input for the bridge network. The control circuit includes two transistor amplifiers for amplifying the alternating current signal from the bridge when the bridge is unbalanced; a power output transistor in the collector circuit of which is the winding of the D.C. relay to be controlled; a shunting transistor which renders the circuit phase sensitive; and rectifying means for application of D.C. potentials to the collector terminals of the transistors.

When the signal is in phase with the source, the shunting transistor conducts during the negative half cycles of the signal to render the output transistor immune to in-phase signals. When the signal is out of phase with the source, the shunting transistor conducts during the positive half cycles of the signals, permitting the negative half cycles of the signal to be applied to the base of the output transistor. In this manner unbalance of the bridge in one direction produces an out-of-phase signal that during each negative half cycle is impressed on the output transistor for energization of the relay. The relay, when energized, closes a circuit over its armature which energizes means to restore the temperature to that desired. When the bridge is unbalanced in the other direction, an in-phase signal is impressed upon the control circuit which signal, as heretofore indicated, is suppressed before application to the output transistor. Hence the relay will be deenergized and its armature in a position to open the temperature restoring circuit to close another circuit.

For a better understanding of the invention and of the advantages thereof reference may be had to the accompanying drawing which is a schematic diagram of a circuit representing the preferred embodiment of the invention.

In the drawing a source of 110 v. alternating current is indicated by the terminals 2 across which is connected the primary of transformer 4. A secondary 6 of the transformer provides voltage in the neighborhood of 6.3 v. for energization of a bridge circuit 7. Resistors 8 and 10, each preferably of relatively low resistance, comprise two arms of the bridge. A resistor 12 of the order of 10K comprises a third arm of the bridge and a thermistor 14 comprises the fourth arm of the bridge. It will be understood that the thermistor 14 will be located in the environment to be maintained at a desired temperature, as for example, in an oven. For this purpose the thermistor 14 is shown connected with dashed lines to the leads 16 and 18 leading to the bridge. Preferably, to provide for initial balance of the bridge for a desired temperature, a resistor 19 is connected between resistors 8 and 10 and an adjustable tap thereon is connected through a line 20 which may be grounded, to one end of a second secondary winding 22 on transformer 4. The voltage produced across winding 22 may be of the order of 25 v. This secondary winding provides the operating energy for the control circuit now to be described. The point of the bridge network diagonally opposite to the tap on resistor 19, namely, the junction between resistor 12 and the thermistor lead 18, is connected through a relatively large capacitor 24 to the base of a transistor amplifier 26. The emitter of transistor 26 is connected through an adjustable resistor 28 to line 20 and the collector is connected through resistors 30 and 32 and a diode 34 to the other end of secondary 22. The junction of resistors 30 and 32 is connected to line 20 through a capacitor 35. A resistor 36 is connected across the base and collector of transistor 26. The collector of transistor 26 is coupled through a capacitor 38 to the base of a second amplifying transistor 40 which base is also connected to line 20 through a resistor 42. The collector of transistor 40 is connected through a resistor 44 to a line 46 which is maintained at a negative D.C. potential by the provision of a rectifying and filtering circuit comprising two parallel connected capacitors 48, a resistor 50 and a diode 52. Diodes 34 and 52 are both polarized in a direction to maintain the collector leads negative.

The collector of transistor 40 is connected through a resistor 54 to the collector of a shunting transistor 56 and to the base of a power transistor 58. The emitter of transistor 40 is connected directly to line 20 and a capacitor 60 is connected across the collector and emitter of that transistor. The base of transistor 56 is connected to line 20 through a resistor 62 and to secondary winding 22 through a resistor 64. Thus signal modified rectified voltage is applied to the collector of transistor 56 but alternating voltage is applied to the base.

The emitter of output transistor 58 is connected directly to line 20 and the collector is connected through the winding 66 of the direct current relay to line 46. A capacitor 68 is connected across the relay winding. The armature 70 of the relay is connected to ground. A front contact of the relay is connected through any suitable heating means diagrammatically indicated in block form at 72 to the undergrounded side of the power line 2. A back contact of the armature 70 is connected through any suitable cooling means indicated diagrammatically in block form at 74 to the ungrounded power line 2.

The operation of the circuit so far described is as follows: Assuming a drop in temperature of the oven or other encloseure the temperature of which is measured by the thermistor 14, the resistance of the thermistor 14 will increase and unbalance the bridge to apply a signal through capacitor 24 to the base of transistor 26. This signal will cause transistor 26 to conduct and a varying voltage will appear at the collector thereof which, through capacitor 38, is impressed upon the base of transistor 40. Transistor 40 amplifies the signal and impresses it upon the collector of transistor 56 which signal, if not passed by transistor 56, will be impressed upon the base of the output transistor 58. If the signal wave at the collector of transistor 40 is out-of-phase with the supply voltage then during the positive swing of the signal on the collection of transistor 56 the base will be driven negative by the alternating potential from winding 22. Accordingly transistor 56 will conduct and no positive pulse will be transmitted to the base of transistor 58. During the negative half cycles of the signal from transistor 40 the base of transistor 56 will be driven positive from the source and accordingly that transistor will not conduct and the negative pulses will be transmitted to the base of transistor 58 causing conduction through that transistor and energization of the relay. Accordingly, so long as the bridge remains unbalanced and emits a signal out-of-phase with the source, the relay will be energized as the result of application of the negative half cycles of the signal to the base of transistor 58. In order to be sure that no part of the positive half cycles of the signal is impressed upon the output transistor should the signal not exactly be out-of-phase with the source, a small amount of D.C. bias is applied to the base of transistor 56 through a resistor 76 connecting line 46 to the base of transistor 56. This insures that transistor 56 will not only conduct during the entire positive half cycle of the out-of-phase signal but also through a small fraction of the negative half cycle of such signal.

When the temperature has been restored to that desired the bridge comes into balance, no signal is applied to the base of transistor 26 and hence that transistor ceases to conduct. Accordingly no signal is impressed on the output transistor and the relay releases. Should the temperature rise above the desired value the bridge becomes unbalanced in the other direction and an in-phase signal is impressed through capacitor 24 upon the base of transistor 26. The in-phase signal will be amplified by transistors 26 and 40 and applied to the collector of transistor 56. During the positive half cycle of the signal the transistor 56 will not conduct because the base is also rendered positive by the in-phase voltage of the source. However, the positivve pulses applied to the base of the output transistor 58 will not cause conduction of that transistor because the emitter thereof is tied to line 20. During the negative half cycles of the in-phase signal the base of transistor 56 is driven more negative by the voltage from the source and accordingly that transistor will conduct and short the output transistor. Accordingly during neither half cycle of the in-phase signal will the relay be energized.

As diagrammatically illustrated in the drawing the relay armature 70 over its back contact could control a means for cooling the environment of the thermistor 14 when the armature releases. For example, the circuit 74 might include a solenoid valve controlling emission of a coolant to the neighborhood of the thermistor or the device 74 could be a fan energized when the circuit thereof is closed.

For illustrative purposes, specific values of the various components of a circuit embodying the invention are given in the following table. It will be appreciated that components of other values could be employed.

| | |
|---|---|
| Transistors 26, 40, and 56 | 2N382 |
| Transistor 58 | 2N460 |
| Capacitors 48, 24, and 35 microfarads | 10 |
| Condenser 38 do | 50 |
| Condenser 60 do | .1 |
| Condenser 68 do | 5 |
| Resistor 50 ohms | 470 |
| Resistors 32 and 64 | 3.9K |
| Resistor 36 | 470K |
| Resistors 30, 42, and 44 | 10K |
| Resistor 54 | 4.7K |
| Resistor 76 | 2.7K |
| Resistor 62 ohms | 820 |

The invention has now been described in connection with a specific embodiment thereof. It will be apparent that the invention provides efficient means for distinguishing between the directions of unbalance of an alternating current network and provides means for control of a direct current circuit in response to such unbalance.

Although the invention has been described in connection with P–N–P transistors that are rendered conductive by application of negative pulses to the base terminals thereof, N–P–N transistors rendered conductive by positive signal pulses could be employed as will be apparent to those skilled in the art. Other variations within the scope of the invention as, for example, additional amplifier stages, other types of balancing networks and other types of condition responsive elements will also occur to those skilled in the art.

What is claimed is:

1. A phase sensitive alternating current amplifier for control of a direct current output circuit in response to an alternating current signal comprising in combination an alternating current source of energy, an alternating current signal source, a transistor amplifier having a collector, a base and an emitter, current rectifying means connected in series with the collector and emitter of said transistor across said first mentioned source, means coupling said signal source to the base of said transistor to yield an amplified signal at its collector, a second transistor and an output transistor, each having a collector, a base and an emitter, the collector of said second transistor and the base of said output transistor being tied together and connected to the collector of said first transistor for reception of the amplified signal therefrom, the emitters of said second and output transistors being connected together and to said first mentioned source, a direct current output circuit connected between the collector of said output transistor and said current rectifying means for energization when said output transistor is rendered conductive by the half cycles of the signal of a given polarity impressed on its base and means for impressing alternating potentials on the base of said second transistor in phase with said first mentioned source whereby said second transistor shunts said output transistor during half cycles of said given polarity when the signal is in phase with said first mentioned source to render said output transistor conductive only during half cycles of out-of-phase signals.

2. The phase sensitive amplifier according to claim 1 including a fourth transistor connected to receive and amplify signals from said signal source to impress amplified signals on the base of said first transistor.

3. The phase sensitive amplifier according to claim 1 including means for applying to the base of said second transistor a direct current bias to render such transistor conductive not only during half cycles of said given polarity but also for portions of the half cycles of opposite polarity during application of in-phase signals to said circuit.

References Cited in the file of this patent

UNITED STATES PATENTS

| | | |
|---|---|---|
| 2,730,304 | Markow et al. | Jan. 10, 1956 |
| 2,832,946 | Beck | Apr. 29, 1958 |
| 2,967,982 | Dubbelman | Jan. 10, 1961 |